United States Patent
Prasad et al.

(10) Patent No.: US 10,207,643 B2
(45) Date of Patent: Feb. 19, 2019

(54) CAMERA BASED TRAILER DETECTION AND TRACKING

(71) Applicant: Aptiv Technologies Limited, St. Michael (BB)

(72) Inventors: Premchand Krishna Prasad, Carmel, IN (US); Robert J. Cashler, Kokomo, IN (US)

(73) Assignee: APTIV TECHNOLOGIES LIMITED (BB)

( * ) Notice: Subject to any disclaimer, the term of this patent is extended or adjusted under 35 U.S.C. 154(b) by 0 days.

(21) Appl. No.: 15/257,062

(22) Filed: Sep. 6, 2016

(65) Prior Publication Data

US 2018/0068447 A1 Mar. 8, 2018

(51) Int. Cl.

| | | |
|---|---|---|
| *G06K 9/00* | (2006.01) | |
| *B60R 1/00* | (2006.01) | |
| *G06T 7/00* | (2017.01) | |
| *H04N 7/18* | (2006.01) | |
| *B60D 1/06* | (2006.01) | |
| *B60D 1/62* | (2006.01) | |

(52) U.S. Cl.
CPC ............ *B60R 1/00* (2013.01); *B60D 1/06* (2013.01); *B60D 1/62* (2013.01); *G06K 9/00791* (2013.01); *G06T 7/0008* (2013.01); *G06T 7/0042* (2013.01); *G06T 7/0085* (2013.01); *H04N 7/183* (2013.01); *B60R 2300/80* (2013.01)

(58) Field of Classification Search
CPC ............................ B06R 1/002; G06K 9/00791

USPC .......................................................... 348/148
See application file for complete search history.

(56) References Cited

U.S. PATENT DOCUMENTS

| 9,477,894 | B1* | 10/2016 | Reed ................ G06K 9/00791 |
|---|---|---|---|
| 2009/0005932 | A1* | 1/2009 | Lee ........................ B60D 1/30 |
| | | | 701/41 |
| 2013/0222592 | A1* | 8/2013 | Gieseke .................. G08G 1/04 |
| | | | 348/148 |
| 2014/0160276 | A1* | 6/2014 | Pliefke ..................... B60R 1/00 |
| | | | 348/118 |
| 2015/0120141 | A1 | 4/2015 | Lavoie et al. |
| 2016/0098604 | A1 | 4/2016 | Min |
| 2016/0153778 | A1* | 6/2016 | Singh ........................ G06T 7/60 |
| | | | 701/36 |
| 2017/0217368 | A1* | 8/2017 | Lewis ....................... B60R 1/00 |

FOREIGN PATENT DOCUMENTS

| GB | 2 518 857 A | 4/2015 |
|---|---|---|
| JP | 2002 068032 A | 3/2002 |

* cited by examiner

*Primary Examiner* — Jeremiah C Hallenbeck-Huber
(74) *Attorney, Agent, or Firm* — Joseph Victor Bonadies

(57) ABSTRACT

A trailer detection system is configured to determine a presence of a trailer towed by a host-vehicle. The system includes a camera and a controller. The camera is used to capture an image of an area behind a host vehicle. The controller is in communication with the camera. The controller is used to detect a position of an edge in the image and determine that the edge is associated with a trailer towed by the host vehicle when the position of the edge moves less than a movement threshold.

2 Claims, 5 Drawing Sheets

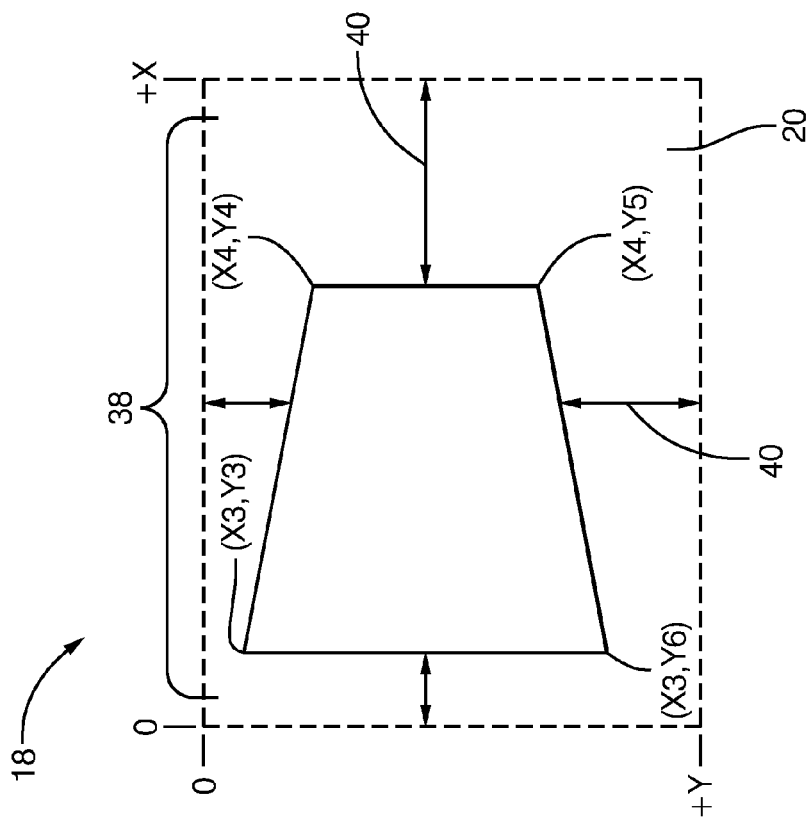
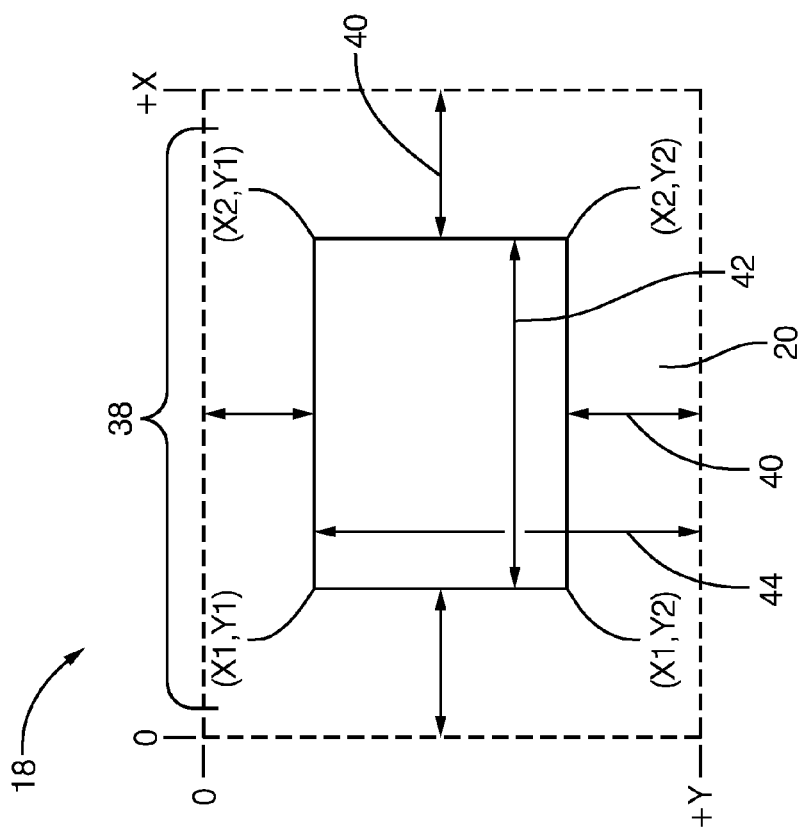
FIG. 4A
FIG. 4B

CAMERA BASED TRAILER DETECTION AND TRACKING

TECHNICAL FIELD OF INVENTION

This disclosure generally relates to a trailer-detection system, and more particularly relates to a camera based trailer-detection system capable of tracking a trailer towed by a host-vehicle.

BACKGROUND OF INVENTION

It is known to detect a presence of a trailer being towed by a host-vehicle. Typical trailer-detection systems may require an operator of the host-vehicle to input a dimension of the trailer, or require the operator to position the trailer such that the trailer-detection system may be calibrated. Other trailer-detection systems rely on the connection of a special wire harness from the trailer to the host-vehicle to indicate a presence of a trailer, or require the operator to manually activate a tow-switch.

SUMMARY OF THE INVENTION

In accordance with one embodiment, a trailer-detection system configured to determine a presence of a trailer towed by a host-vehicle is provided. The trailer-detection system includes a camera, an angle detector and a controller. The camera is used to capture an image of an area behind a host-vehicle. The angle-detector is used to determine a trailer-angle relative to the host-vehicle of the trailer towed by the host-vehicle. The controller is in electrical communication with the camera and the angle-detector and is used to detect a position of an edge in the image and determine that the edge is associated with the trailer towed by the host-vehicle when the position of the edge moves less than a movement-threshold. The controller is further configured to track the edge based on the trailer-angle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIG. 4A is an illustration of an image from a camera of the system of FIG. 3 in accordance with one embodiment;

FIG. 4B is an illustration of an image from a camera of the system of FIG. 3 in accordance with one embodiment.

DETAILED DESCRIPTION

Figure 1:
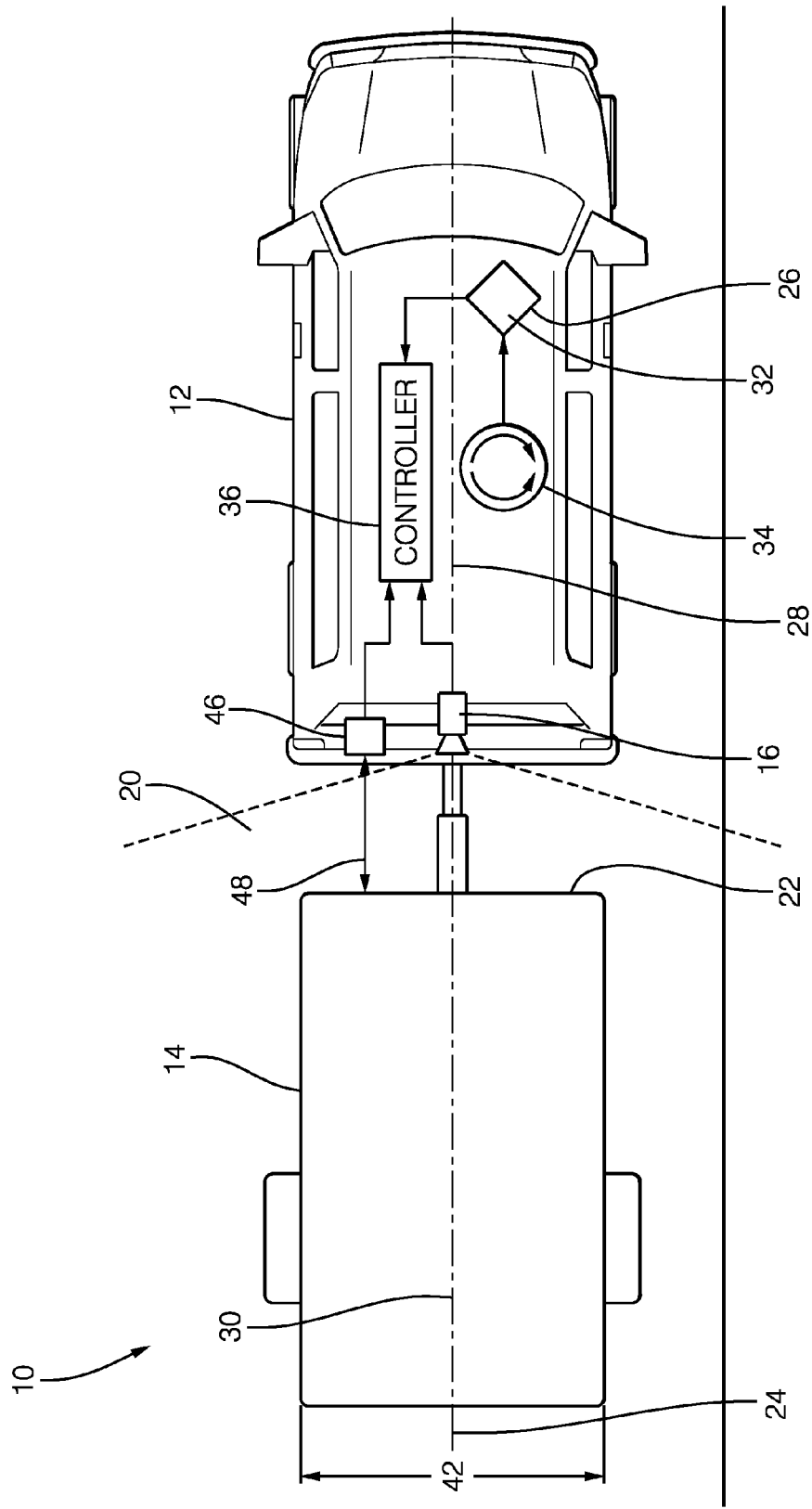
FIG. 1 is top view of a host-vehicle equipped with a trailer-detection system in accordance with one embodiment.

FIG. 1 illustrates a non-limiting example of a trailer-detection system 10, hereafter referred to as the system 10, installed on a host-vehicle 12. As will be described in more detail below, the system is an improvement over prior trailer-detection systems because the system 10 is configured to more accurately detect a presence of a trailer 14, by using a camera 16 to capture an image 18 (FIG. 2A) of an area 20 behind the host-vehicle 12, and to detect and track an edge 22 associated with the trailer 14 based on a trailer-angle 24.

The system 10 includes the camera 16 used to capture the image 18 of the area 20 behind the host-vehicle 12. The camera 16 is preferably a rear-facing video-type camera 16 or camera 16 that can capture the image 18 of the surrounding area 20 at a sufficient frame-rate, of ten frames per second, for example. Examples of the camera 16 suitable for use on the host-vehicle 12 are commercially available as will be recognized by those in the art, one such being the ASX340AT from ON Semiconductor® of Phoenix, Ariz., USA.

Figure 3:
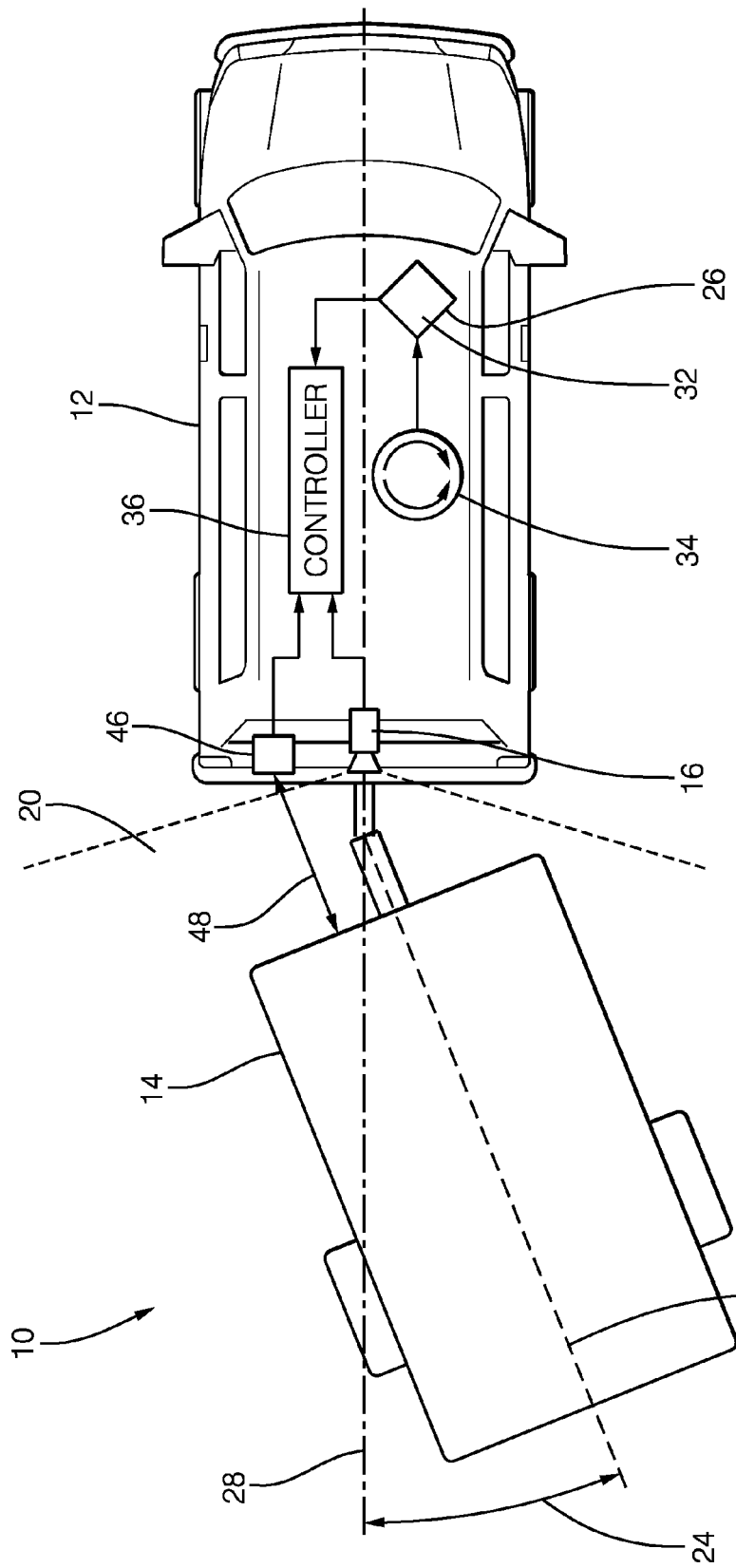
FIG. 3 is a top view of the host-vehicle of FIG. 1 equipped with a trailer-detection system in accordance with one embodiment.
Figure 5:
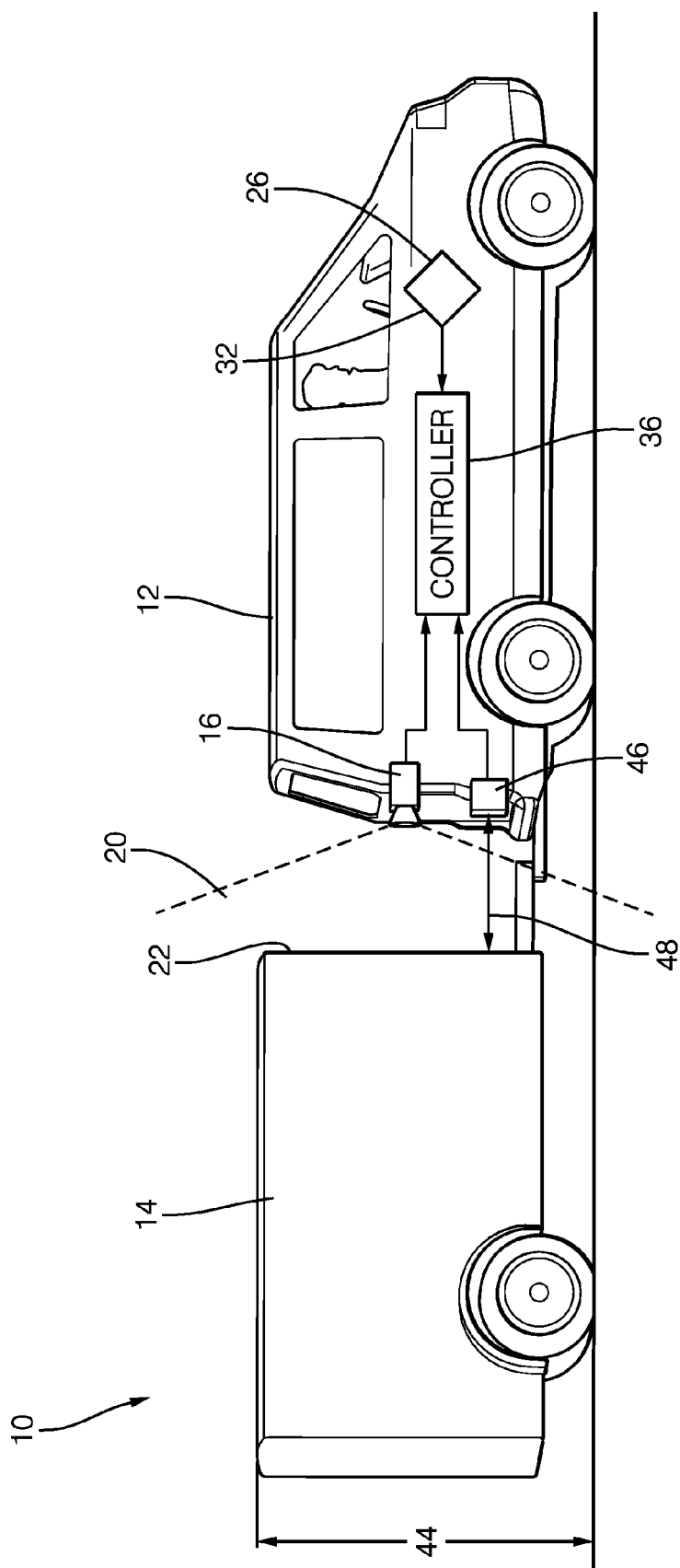
FIG. 5 is a side view of the host-vehicle of FIG. 1 equipped with a trailer-detection system in accordance with one embodiment.

The system 10 also includes an angle-detector 26 used to determine the trailer-angle 24 relative to the host-vehicle 12. The trailer-angle 24 is defined as the angle between a host-vehicle-longitudinal-axis 28 and a trailer-longitudinal-axis 30, and is shown to be zero degrees (0°) in FIG. 1 (i.e. the trailer 14 is directly behind the host-vehicle 12). In contrast, FIG. 3 shows an example when the trailer-angle 24 is not zero degrees. The angle-detector 26 may be a device (not shown) mounted on a trailer-hitch (not shown) of the host-vehicle 12 or on the trailer 14, that is configured to provide a measure of the angle that exists between the host-vehicle-longitudinal-axis 28 and the trailer-longitudinal-axis 30. The angle-detector 26 may be a Lidar-sensor (not shown), a radar-sensor (not shown), or any other suitable method to detect the trailer-angle 24. Preferably, the function of the angle-detector 26 may be provided by a yaw-sensor 32 that may already exist on most vehicles, such as the 6DF-1N6-C2-HWL from Honeywell Sensing and Control, Golden Valley, Minn., USA, and is used to determine a yaw-rate 34 of the host-vehicle 12, from which the trailer-angle 24 may be determined by a controller 36. It is advantageous to use the yaw-sensor 32 of the host-vehicle 12 to determine the trailer-angle 24 to eliminate a separate component of the system 10, reducing cost and complexity.

The system 10 includes the controller 36 in electrical communication with the camera 16 and the angle-detector 26. The controller 36 may include a processor (not shown) such as a microprocessor or other control circuitry such as analog and/or digital control circuitry including an application specific integrated circuit (ASIC) for processing data as should be evident to those skilled in the art. The controller 36 may include a memory (not shown), including non-volatile memory, such as electrically erasable programmable read-only memory (EEPROM) for storing one or more routines, thresholds and captured data. The one or more routines may be executed by the processor to perform steps for determining if signals received by the controller 36 indicate the presence of objects as described herein.

Figure 2A:
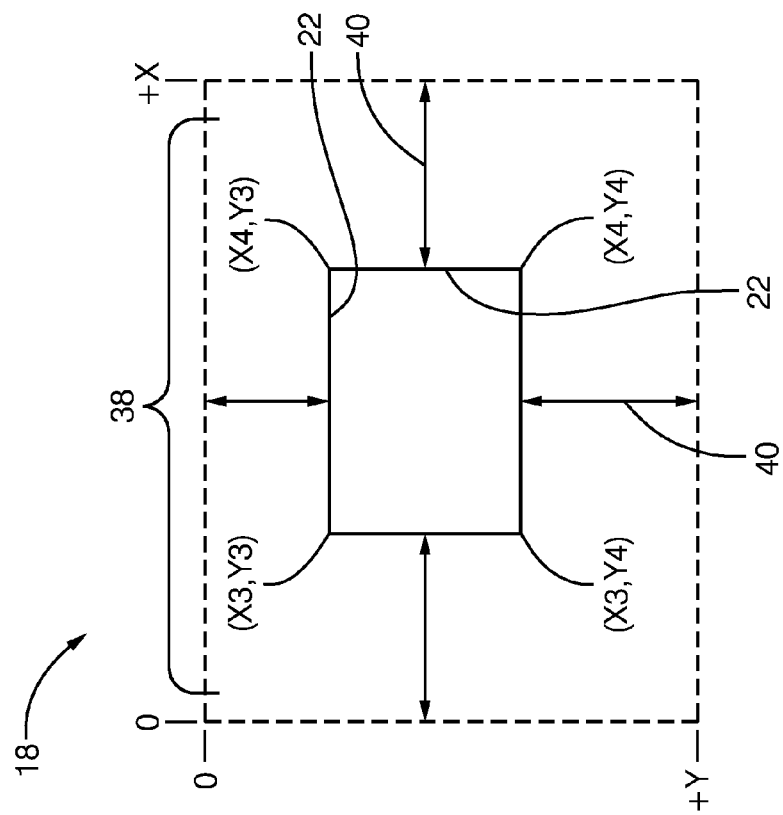
FIG. 2A is an illustration of an image from a camera of the system of FIG. 1 in accordance with one embodiment.
Figure 2B:
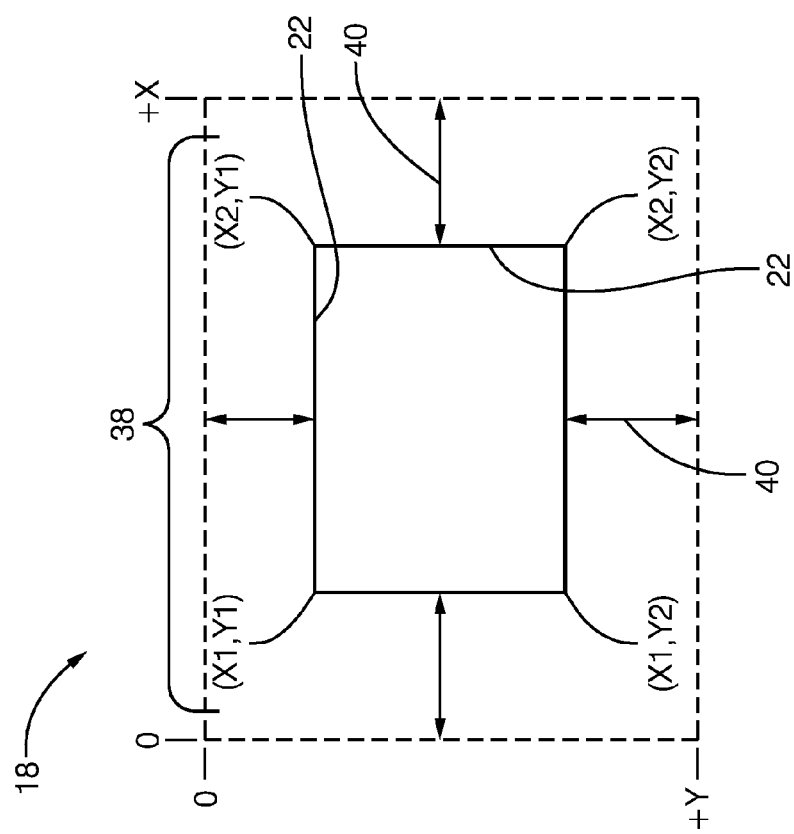
FIG. 2B is an illustration of an image from a camera of the system of FIG. 1 in accordance with one embodiment.

The controller 36 is configured (e.g. programmed or hardwired) to detect a position 38 (FIG. 2A) of the edges 22 in the image 18 captured by the camera 16 and determine whether the edges 22 are associated with the trailer 14 being towed by the host-vehicle 12. The controller 36 may use known methods for detecting the edges 22, such as Sobel or Canny filters or similar methods known to one skilled in the art. The controller 36 is further configured to track the position 38 of the detected edges 22 using a Kalman filter, or other similar methods known to one skilled in the art. FIG. 2A and FIG. 2B illustrate images 18 of tracked edges 22 at two points in time (Time=T0 and Time=T1) that have different positions 38. FIG. 2B illustrates an example where the tracked edges 22 have moved more than a predetermined movement-threshold 40. In the non-limiting example illustrated in FIG. 2A and FIG. 2B the controller 36 may determine the tracked edges 22 of FIG. 2B are not associated with the trailer 14. That is, if the tracked edges 22 in the image 18 of the typical camera 16 that has a resolution of 640×480 pixels have moved by more than five (5) pixels in any direction, the controller 36 may determine that the edges 22 are not associated with the trailer 14. One skilled in the art will recognize that using a camera 16 with a resolution higher than 640×480 pixels may require a movement-threshold 40 value larger than 5 pixels to signify that the tracked edge 22 has changed in position 38.

When the tracked edges 22 are determined by the controller 36 to be associated with the trailer 14 being towed by the host-vehicle 12, the controller 36 may use the trailer-angle 24 to compensate for the movement of the position 38 of the edges 22. FIG. 3 illustrates the system 10 of FIG. 1 with the trailer-angle 24 greater than zero degrees (i.e. the trailer 14 is not directly behind the host-vehicle 12). FIG. 4A and FIG. 4B illustrate the images 18 of the tracked edges 22 of the trailer 14 at two points in time that are indicative of different trailer-angles 24, that is, FIG. 4A illustrates the image 18 indicative of the trailer-angle 24 of zero degrees at time=T2 and FIG. 4B illustrates the image 18 indicative of the trailer-angle 24 that is greater than zero degrees at time=T3. The orientation of the trailer 14 relative to the host-vehicle 12 is the same in FIG. 4B and in FIG. 3. The controller 36 is configured to adjust the movement-threshold 40 for the tracked edges 22 based on the trailer-angle 24 so that the tracked edges 22 are determined by the controller 36 to remain associated with the trailer 14. The controller 36 adjusts the movement-threshold 40 by using the trailer-angle 24 as input to a rotation-matrix (not shown) such that the tracked edges 22 remain associated with the trailer 14, as will be understood by one skilled in the art of Kalman filters.

The controller 36 is further configured to determine a trailer-width 42 and a trailer-height 44 (FIG. 4A) based on the position 38 of the tracked edges 22 in the image 18 and a known intrinsic and extrinsic parameters of the camera 16. The intrinsic parameters of the camera 16 are established by the manufacturer of the camera 16 and may include a focal-length (not shown), a transformation between an image-plane coordinates and a pixel coordinate (not shown), and a geometric distortion introduced by the optics (not shown) of the camera 16. The extrinsic parameters of the camera 16 are established at the point of installation of the camera 16 on the host-vehicle 12 and may include a translation-vector between the origins of the camera-reference-frame and the world-reference-frame (not shown). With the known intrinsic and extrinsic parameters of the camera 16, along with an assumed predetermined distance between the trailer 14 and the host-vehicle 12 (one meter, for example), the controller 36 may use a weighted-average of the number of pixels to determine the trailer-width 42 and the trailer-height 44, as will be recognized by one skilled in the art of camera-calibration. The controller 36 may also estimate the distance between the trailer 14 and the host-vehicle 12 by counting the number of pixels in the image 18 between the bottom-edge of the front of the trailer 14 and the bottom of the frame of the image 18. The number of pixels between the bottom-edge of the front of the trailer 14 and the bottom of the frame of the image 18 may then be compared to the calibration parameters of the camera 16 to estimate the distance between the trailer 14 and the host-vehicle 12 as will be recognized by one skilled in the art of camera-calibration.

The system 10 may also include a ranging-sensor 46 in electrical communication with the controller 36. The ranging-sensor 46 may be used to determine the distance or range 48 between the trailer 14 and the host-vehicle 12. Preferably, the range 48 may be used by the controller 36 in the determination of the trailer-width 42 and the trailer-height 44, as the range 48 provides the controller 36 with a more accurate reference dimension for the world-reference-frame of the camera 16. The ranging-sensor 46 may be a radar-sensor such as the radar-sensor from Delphi Inc. of Troy, Mich., USA and marketed as an Electronically Scanning Radar (ESR) or a Rear-Side-Detection-System (RSDS), or preferably the ranging-sensor 46 may be an ultrasonic-sensor such as the TIDA-00151 from Texas Instruments of Dallas, Tex., USA.

Accordingly, a trailer-detection system 10, and a controller 36 for the trailer-detection system 10 is provided. The system 10 is an improvement over prior trailer-detection systems because the system 10 is configured to more accurately detect the presence of the trailer 14, by using the camera 16 to capture the image 18 of the area 20 behind the host-vehicle 12, and to detect and track the edges 22 associated with the trailer 14 based on the trailer-angle 24. The system 10 also determines the trailer-width 42 and the trailer-height 44 without requiring input from an operator of the host-vehicle 12 or requiring any separate calibration procedures by the operator of the host-vehicle 12.

While this invention has been described in terms of the preferred embodiments thereof, it is not intended to be so limited, but rather only to the extent set forth in the claims that follow.

We claim:

1. A trailer-detection system configured to determine a presence of a trailer towed by a host-vehicle, said system comprising:
   a camera used to capture an image of an area directly behind a host-vehicle; and
   a controller in communication with the camera, said controller configured to detect a position of edges in the image and determine that the edges are associated with a front of a trailer towed by the host-vehicle when the position of the edges moves less than a movement-threshold, wherein the movement-threshold corresponds to a predetermined pixel-count, the system includes an angle-detector used to determine a trailer-angle, in accordance with the determination that the edges are associated with the front of the trailer, the controller is further configured to adjust the movement-threshold for the tracked edges based on the trailer-angle so that the tracked edges are determined by the controller to remain associated with the front of the trailer, wherein the controller is further configured to determine a trailer-height based the position of the edges associated with the front of the trailer.

2. The system in accordance with claim 1, wherein the controller is further configured to determine a trailer-width based the position of the edges associated with the front of the trailer.

\* \* \* \* \*